United States Patent [19]

Balzer et al.

[11] 4,311,880
[45] Jan. 19, 1982

[54] KEY TELEPHONE HOLD ARRANGEMENT

[75] Inventors: Gerry C. Balzer, Freehold; Alan M. Gordon, Matawan, both of N.J.; Michael W. Leibowitz, Charleston, S.C.; Karl R. Wittig, New York, N.Y.

[73] Assignee: Bell Telephone Laboratories, Incorporated, Murray Hill, N.J.

[21] Appl. No.: 205,259

[22] Filed: Nov. 10, 1980

[51] Int. Cl.[3] .................................................. H04Q 5/18
[52] U.S. Cl. ..................................... 179/99 H; 179/81 R
[58] Field of Search ................. 179/99 H, 81 R, 18 F, 179/18 FA

[56] References Cited

U.S. PATENT DOCUMENTS

| | | | |
|---|---|---|---|
| 3,742,151 | 6/1973 | Ruether | 179/99 H |
| 3,840,710 | 7/1975 | Angner et al. | 179/99 H |
| 3,857,072 | 12/1974 | James et al. | 179/99 H |
| 3,895,192 | 7/1975 | Angner et al. | 179/99 H |
| 3,899,192 | 7/1975 | Angner et al. | 179/84 A |
| 3,996,426 | 12/1976 | Lancaster | 179/99 H |
| 4,057,693 | 11/1977 | Angner et al. | 179/99 H |
| 4,158,755 | 6/1979 | Daniele | 179/99 H |

*Primary Examiner*—Gerald L. Brigance
*Attorney, Agent, or Firm*—John A. Caccuro

[57] ABSTRACT

There is disclosed a line circuit for establishing a hold condition on a communication line, extending between a switching machine and a key telephone station, during an open switching interval (OSI) when no current flows on the communication line. The control signal required to enable the hold circuit is arranged to be time dependent. For a fixed time interval, which bridges the OSI period, after the telephone station answers a ringing line a hold condition is enabled (402) exclusively by a control signal on the A lead from the station. This time dependent hold enable arrangement permits a hold capability during an OSI condition. After this time interval elapses (403) a hold condition is enabled by (404) a joint signal condition on the A lead and a current continuity condition on the communication line.

13 Claims, 5 Drawing Figures

KEY TELEPHONE HOLD ARRANGEMENT

FIELD OF THE INVENTION

This invention relates to a key telephone line circuit and more particularly to a hold circuit of a key telephone line circuit.

BACKGROUND OF THE INVENTION

A telephone line circuit is a well known basic part of a telephone network which provides the necessary interface between a subscriber's set and the switching equipment at central switching points such as PBXs or central offices. More specifically, a telephone line circuit performs those supervisory and control functions that are incident to the establishment and maintenance of a connection between a central switching point and one or more local subscribers' telephone sets. One such control function is the hold function where a line is kept in an inactive but waiting condition.

A hold condition is activated by a subscriber pressing the hold button on the telephone set. The establishment of a hold condition requires particular signal conditions on both the communication pair and the A-lead extending between the line circuit and the subscriber's telephone set. Typically a hold condition consists of a non-ground (disconnect) signal on the A-lead together with a telephone connection signal as evidenced by current on the communication pair (tip and ring leads). Similarly, signal conditions on both the communication pair and on the A-lead are also required to establish a telephone on-hook or disconnect condition. In contrast to the establishment of a hold condition, however, a telephone on-hook condition requires a non-ground (disconnect) signal on the A-lead, together with the absence of current (disconnect) signal on the communication pair.

Under certain circumstances battery from a central office may temporarily be removed from the tip (T) and ring (R) leads. Such a condition is commonly referred to as an open switching interval (OSI) which may last up to 460 milliseconds. These OSI conditions typically occur within about one half of a second after an incoming call is answered. A subscriber attempt to establish a hold condition during the OSI period results in the inadvertent dropping or disconnection of the telephone call. A disconnection results because the conditions for a telephone station on-hook condition are satisfied. When the subscriber presses the hold button a non-ground signal is established on the A-lead. This condition together with the OSI caused absence of current on the T and R leads satisfies the telephone station disconnect requirements and hence the telephone call is dropped.

While the likelihood of a hold condition request being initiated during the OSI period is small, the proliferation of automatic answering devices may enhance the likelihood. Thus, the elimination of this possibly troublesome anomaly in the telephone circuit operation is important.

Prior art approaches to enabling a hold condition during an OSI condition include temporarily bridging, during the OSI, an auxiliary central office battery supply voltage across the T and R leads, altering the central office equipment, or changing central office switch timing to eliminate the OSI interval. These central office type solutions require extensive changes and are overly complicated and expensive.

Thus, it is a continuing quest to solve the problems of establishing a hold condition during OSI conditions without changes in the central office or without using complicated and expensive central office equipment.

SUMMARY OF THE INVENTION

The above problem is solved in accordance with our invention by utilizing a time dependent hold enable arrangement in the line circuit. For a fixed time interval following the answer of an incoming call the disclosed time dependent hold arrangement enables a hold condition to be established by a station disconnect signal on the leads connected to the line circuit from the telephone station. The fixed time interval is made long enough to extend beyond any anticipated OSI period. The preferred embodiment recognizes a non-ground signal condition on the A-lead and establishes the hold condition solely in response thereto. Once the hold condition is established, the line circuit generates a hold release delay to prevent release during OSI intervals.

More particularly, when the termination of ringing (off-hook) is detected the timed interval is established. This timed interval (BUSY3 state) is determined by a flip-flop which remains set for approximately 750 milliseconds. During this timed interval state the HOLD state is established if the hold enable arrangement detects the disappearance of a ground on the A-lead. After the timed interval (750 ms) has elapsed BUSY3 state flip-flop is cleared. The HOLD state can thereafter only be established in the conventional manner requiring both the disappearance of a ground (open) on the A-lead and a continuance of current flow on the C.O. line (tip and ring leads).

Since the disclosed hold arrangement utilizes only an A-lead enable during the first 750 ms time interval of an answered call, a HOLD state results when the subscriber goes on-hook or presses the hold button at the telephone station. Thus, in the unlikely situation that a called subscriber wants to hang-up within 750 ms of answering a call, the HOLD state is entered when our invention is utilized. To terminate a call during this situation the subscriber must pick-up (go off-hook) to release the HOLD state and then hang up (go on-hook) to terminate the call. This unusual hang-up procedure required by the disclosed hold arrangement during the first 750 ms of a call is considered a reasonable trade off for solving the hold enablement problems during OSI periods. Since it is unlikely that a subscriber will want to hang-up during the first 750 ms of an answered call no significant subscriber inconvenience is expected.

BRIEF DESCRIPTION OF THE DRAWING

The principles of the invention will be more fully appreciated from the illustrative embodiment shown in the drawing, in which.

DETAILED DESCRIPTION

Line Circuit

The disclosed hold arrangement is incorporated in the line circuit described in U.S. Pat. No. 4,057,693 issued to R. J. Angner, et al on Nov. 8, 1977. The line circuit described in the Angner patent and shown in FIG. 1 therein, is connected in shunt across the tip and ring lead of the communication pair (channel) between the central switching office (CO or PBX) and the subscribers station. This line circuit controls the HOLD, BUSY and IDLE conditions of the station and provides the necessary visual and audible signaling to the station. The line circuit operates to detect ac current flowing for ringing control, while also detecting the transient response of the system for hold and disconnect control. The transient signals are generated upon on-hook to off-hook or off-hook to on-hook circuit transitions.

The line circuit keeps track of the present state of the associated telephone station set and compares received signals against the present state to determine to which of the various other states, if any, the line circuit should change. The Angner line circuit utilizes five states: RING, IDLE, HOLD, BUSY1 and BUSY2. The Angner patent description of the operational aspects of these five states are incorporated by reference herein. The two BUSY states are used to control actuation of the HOLD state. The BUSY2 state is also used to control slow switchhook depressions.

Figure 1:
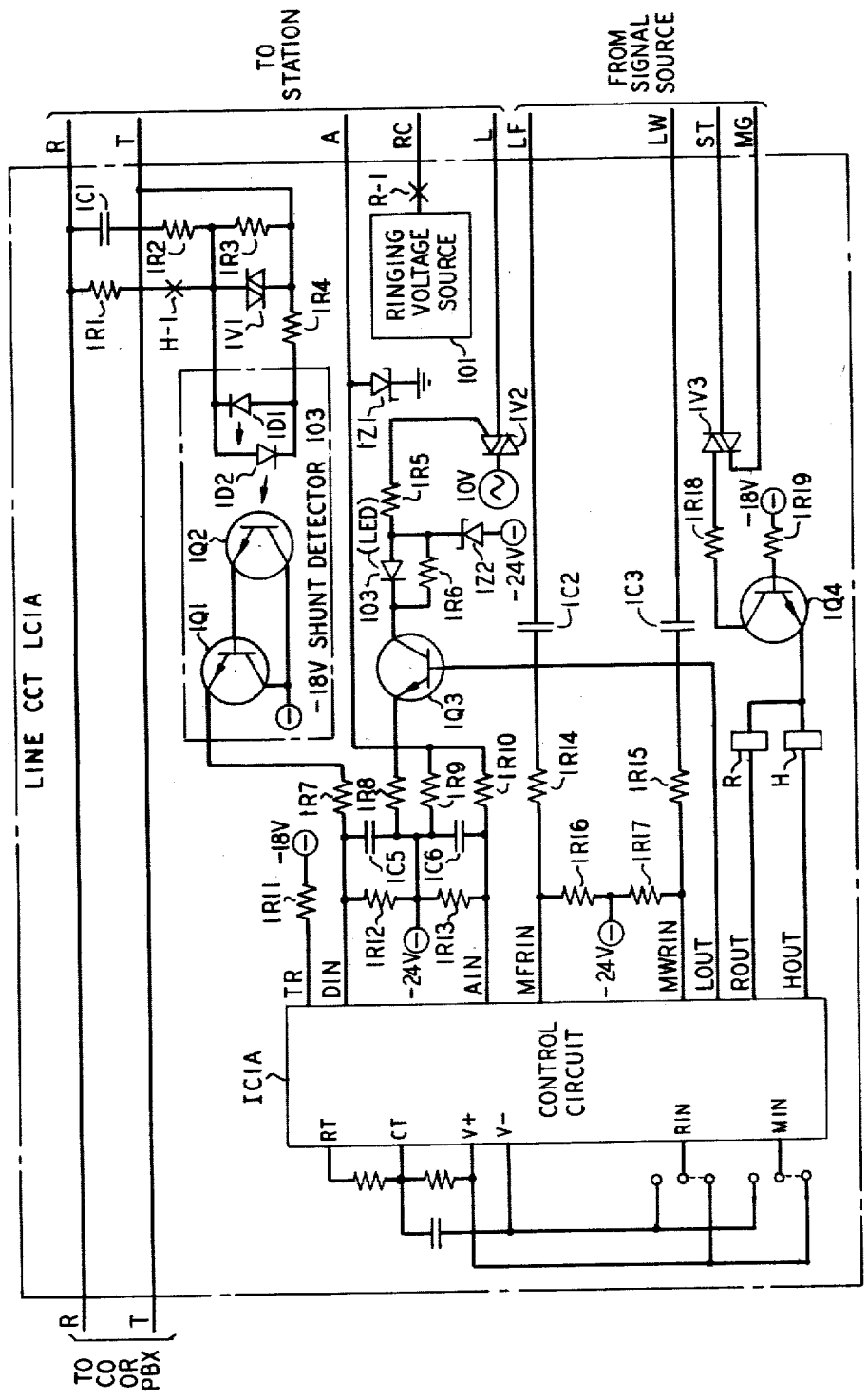
FIG. 1 shows a schematic diagram of a key telephone line circuit incorporating our hold arrangement in control circuit IC1A.
Figure 4:
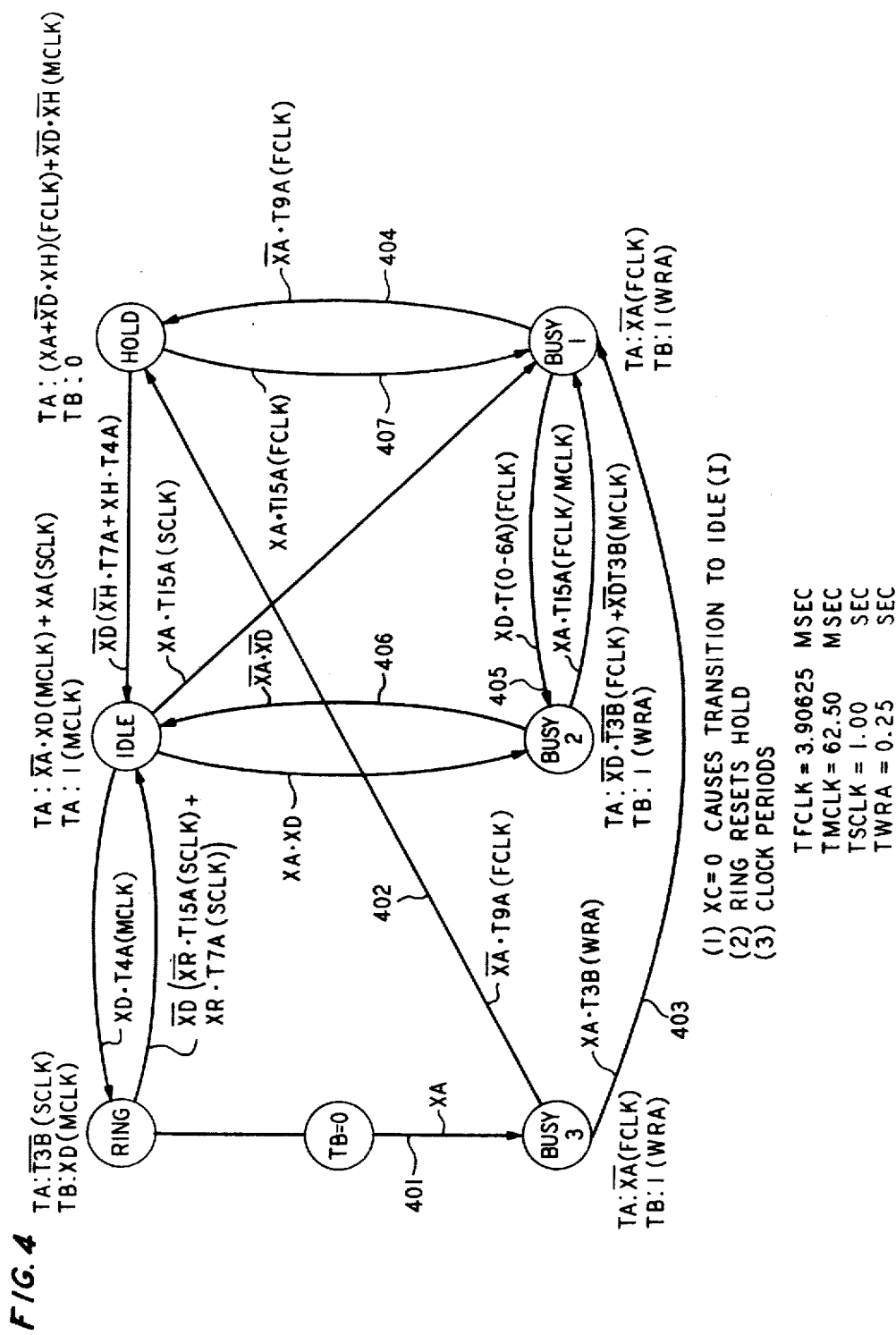
FIG. 4 shows a state diagram of the overall line circuit.

The line circuit disclosed in FIG. 1 of this application includes the circuits of the Angner patent and utilizes the five states of the Angner patent plus a new BUSY3 state. The BUSY3 state is utilized to implement the disclosed time dependent hold enable arrangement. Correspondingly, the following description is directed only to the time dependent hold enable enablement aspect of the operation of a line circuit. Referring to the state diagram of FIG. 4, the enclosed description describes only the operation of the new BUSY3 state and its transition to either the BUSY1 or HOLD state. The operation of the remainder of the state diagram of FIG. 4 is described in the aforementioned Angner et al patent which description is incorporated by reference herein.

Figure 2:
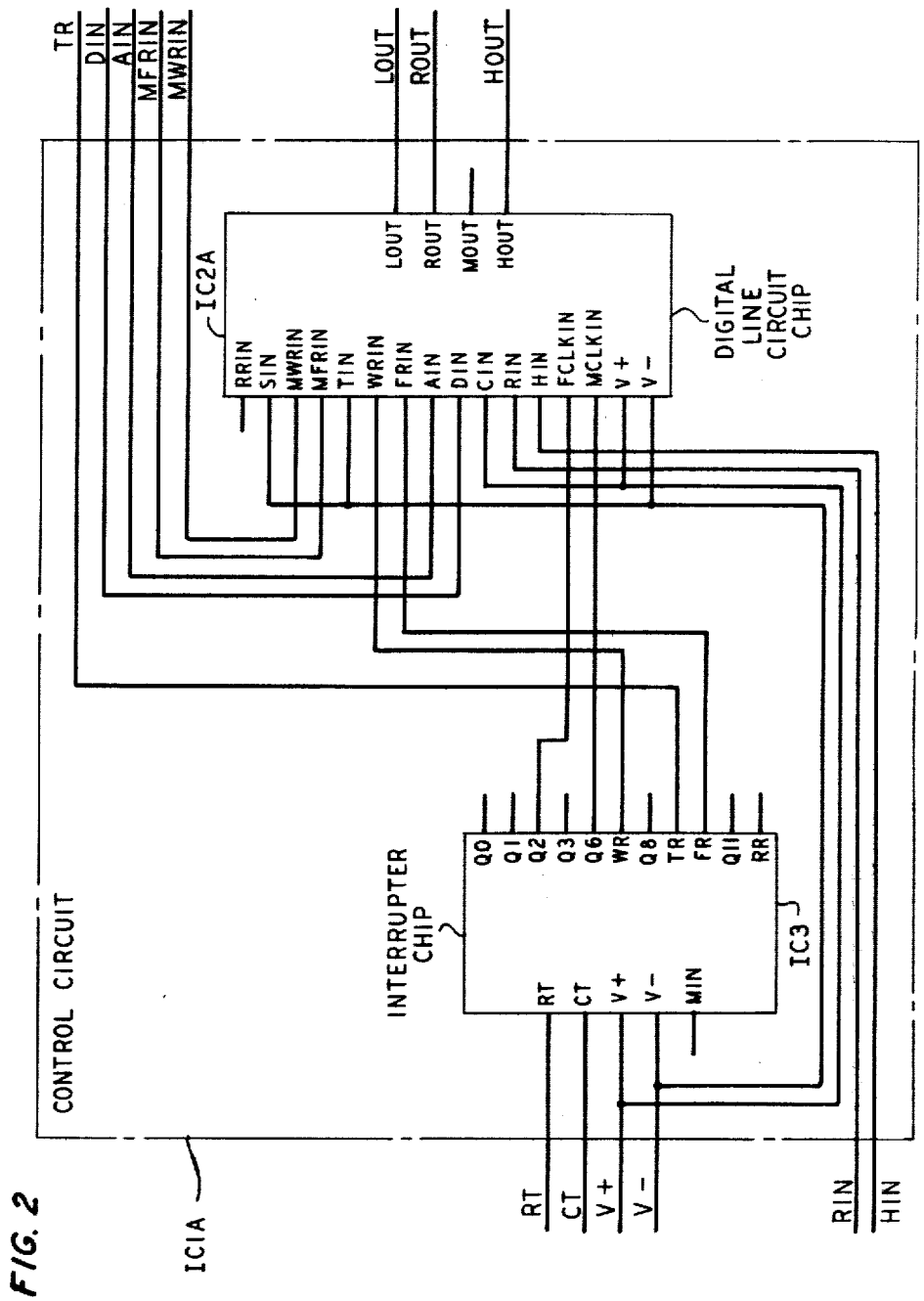
FIG. 2 shows a block diagram of the major integrated circuit chips contained in control circuit IC1A.
Figure 3:
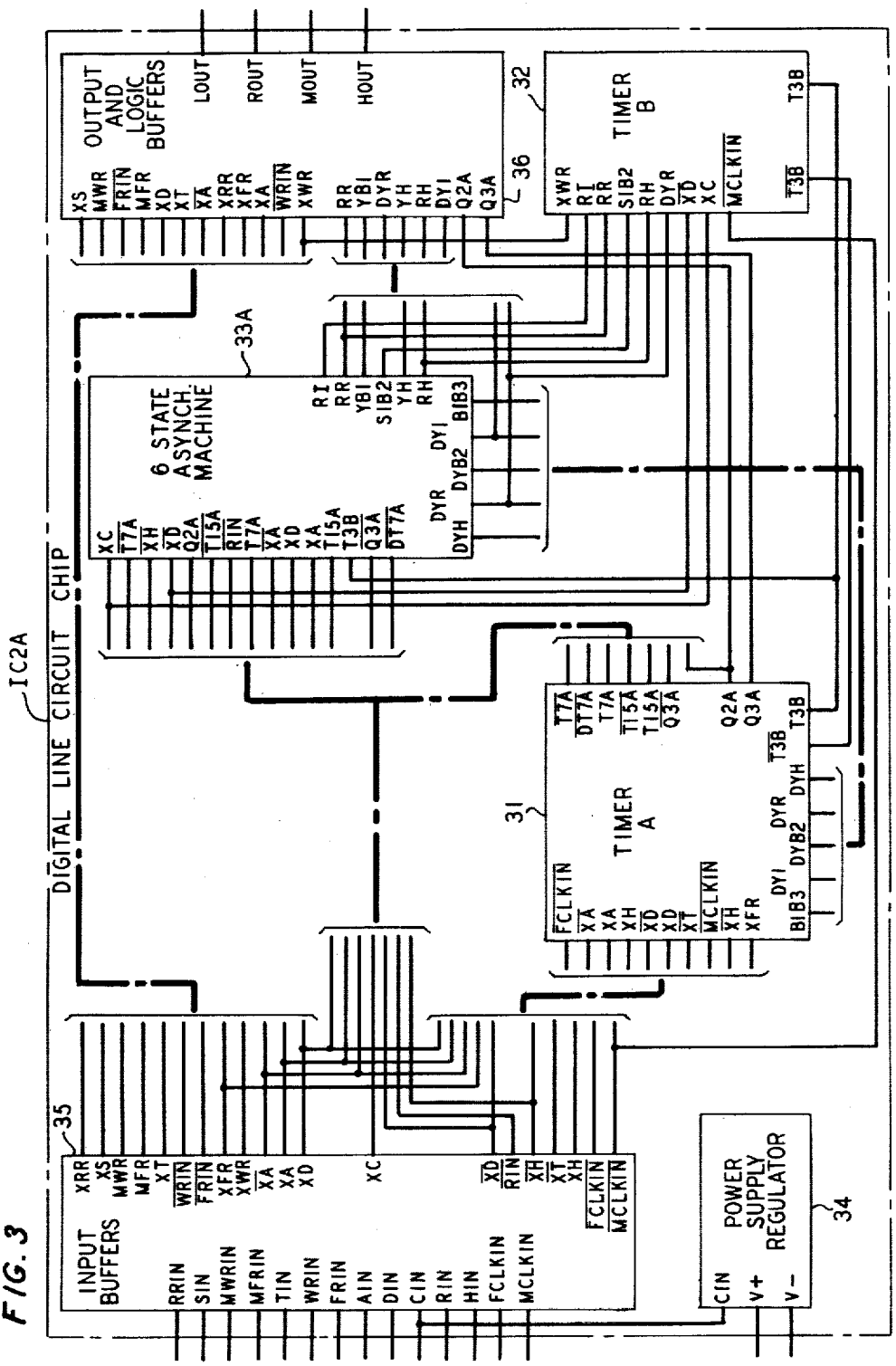
FIG. 3 shows a block diagram of the digital line circuit IC2A of control circuit IC1A.
Figure 5:
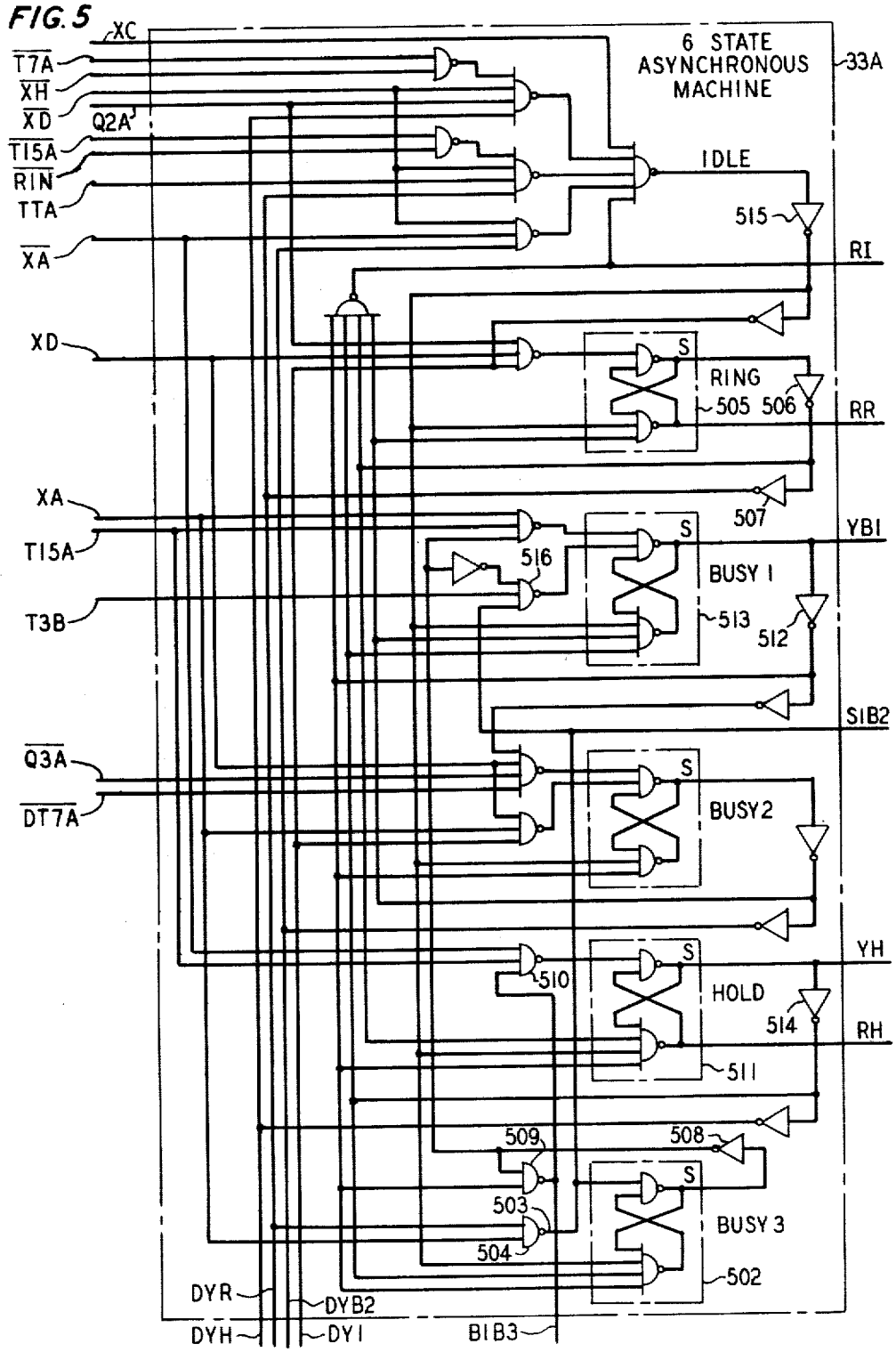
FIG. 5 shows details of the 6 state asynchronous circuit incorporating our hold arrangement.

With reference to FIG. 5, the additional BUSY3 state is implemented as flip-flop circuit 502 and is one of the states of the six state asynchronous machine 33A. FIG. 3 illustrates the relationship of asynchronous machine 33A to the other operational units of digital line circuit chip IC2A. Similarly, FIG. 2 shows the interconnection of digital line circuit chip IC2A to interrupter chip IC3 forming control circuit IC1A. Finally, FIG. 1 shows the connection of control chip IC1A. Finally, FIG. 1 shows the connection of control chip IC1A to the various other components of line circuit LC1A. As noted previously, with the exception of the implementation and operation of the disclosed hold enable arrangement the implementation and operation of line circuit LC1A is identical to that of line circuit LC1 of FIG. 1 of the previously referenced Angner et al patent.

Line circuit LC1A of FIG. 1 is controlled by a six state sequential logic circuit (shown in FIG. 5) that responds to input signals on the A-lead (lead A) and signals appearing across the T and R leads. Note the T and R leads are also referred to herein as a path, a telephone line or as a communication pair or line. The signals appearing across the T and R leads are detected by shunt detector 103 and appear as a digital signal on lead DIN of control circuit IC1A. The signal on the A-lead is converted to a digital signal on lead AIN of control circuit IC1A. Again the operation of these circuits are as described in the referenced Angner et al patent and such description is incorporated herein.

The six states, namely, IDLE (I), RING (R), HOLD (H), BUSY1 (B1), BUSY2 (B2) and BUSY3 (B3) of control circuit IC1A are enabled by interpreting the input signals on leads T, R, A, LF and LW and generate the appropriate output signals for leads RC, L, ST and MG. As shown on FIG. 1 leads T, R, A. RC and L are associated with a connected well known station set while leads LF, LW, ST and MG are associated with a connected well known signal source.

Referring to FIG. 2, the timing associated with the transition between states is performed by counting pulses derived from an interval clock on interrupter chip IC3. The details of the operation of interrupter chip IC3 are as described in the referenced Angner et al patent. Interrupter chip IC3 basically provides WINK, FLASH and RING rates and clock signals for controlling digital line circuit IC2A.

Referring to FIG. 3 a digital line circuit chip IC2A is shown in expanded form. The heart of the circuit is 6-state asynchronous sequential machine 33A which is controlled by inputs from input buffer 35 and by timers 31 and 32. Asynchronous sequential machine 33A and buffer circuit 36 generate outputs HOUT, ROUT, LOUT and MOUT in response to the inputs. The outputs HOUT, ROUT and LOUT are buffered by circuit 36 to drive the switching circuits or busses. Input buffers 35 are designed to minimize the external interface circuitry required.

Referring to FIG. 1, again, simple R-C circuits couple the A-lead and shunt line detector 103 output to the AIN and DIN inputs of control circuit IC1A. The MFRIN and MWRIN inputs are capacitively coupled to the LF and LW outputs from the signal source. Referring to FIG. 2, the RRIN, FRIN, WRIN, MCLKIN and FCLKIN inputs of digital line circuit chip IC2A interface with outputs from the interrupter chip IC3 which provides clock signals for the timers and clocking rates for the signaling circuits. The HOLD and RING abandon time-out options and the test line feature are implemented by controlling the logic levels on the HIN, RIN and TIN (V—) inputs, respectively.

Referring to FIG. 3 again, the state outputs of sequential machine 33A are fed back to the timers 31 and 32 to control counting intervals and rates and are decoded by the output logic circuit 36 to provide the required output signals from digital line circuit IC2A. Power supply regulator 34 provides the correct operating voltages for the integrated circuits. Again reference is made to the referenced Angner et al patent for the particular implementation and detailed operation of circuits 31, 32, 33A, 34, 35, 36.

Hold Circuit

The operation of the disclosed invention is best described with joint reference to FIGS. 4 and 5. The state flow diagram of FIG. 4 which results from the operation of the circuitry shown in FIG. 5. As noted, the disclosed invention utilizes additional state BUSY3 which is entered when answering a line in the RING state. To fully understand the state diagram of FIG. 4, an explanation of the notation utilized is required. The notation XA indicates that lead XA=1 and is utilized when a ground condition exists on lead A. The notation $\overline{XA}$ indicates that lead $\overline{XA}=1$ and that no ground condition exists on lead A. The notation XD indicates lead XD = 1 and that either a transient exists on the T and R leads or current is flowing through the hold bridge via the T and R leads. These conditions cause shunt line detector 103 (FIG. 1) to output a ground condition on lead DIN. The absence of these conditions on leads T and R is indicated by notation $\overline{XD}$.

The timer notations TA and TB refer to timer 31 and timer 32 of FIG. 3. The notation T15A indicates that a state transition requires that timer 31 has reached the count 15. Timer 31 is arranged to operate at one of three selected clock rates (SCLK, MCLK or FCLK). Thus the notation T15A (FCLK) becomes logic 1 when timer 31 reaches a time value of 15 counts at the FCLK rate. In a similar vein timer 32 operates at one of two selected rates (WRA or MCLK). Thus, the notation T3B (WRA) becomes logic 1 when timer 32 reaches a time value of 3 counts at the WRA rate. Note, the WRA clock period rate is one half (0.25 sec) the WR rate (0.5 sec) described in the referenced Angner patent.

In the following description all designations beginning with a 4 refer to FIG. 4 and all designations beginning with a 5 refer to FIG. 5 unless otherwise noted. Assuming that the 6 state asynchronous machine 33A (FIG. 5) is in the RING state a ground condition on the A-lead (XA) causes a transfer, 401, to the BUSY3 state. This occurs when a subscriber answers a ringing telephone (i.e., goes off-hook). At this time, timer 32 is set to zero (TB=0). Referring to FIG. 5, flip-flop 502 is the BUSY3 state flip-flop. Flip-flop 502 is set when a ground appears on lead 503. Gate 504 places a ground on lead 503 when leads XA and DYR are both logic 1. Lead XA is at logic 1 when the A-lead is grounded when the subscriber answers the telephone. Lead DYR is the set side of ring flip-flop 505, after a double inversion through gates 506 and 507, and is logic 1 during the RING state. The output of gate 504 is responsive to the subscriber's answering a ringing line thus terminating the ring signal. Hence, BUSY3 flip-flop 502 is set in response to the grounding of the A-lead.

Referring to FIG. 4, once enabled the BUSY3 state remains for a timed interval following the termination of ringing. During this period the applying of a hold impedance (1R1 of FIG. 1) is responsive solely to a non-ground signal on the A-lead as shown by path 402. During the fixed time interval when OSI periods are likely to occur central office current flow signals or voltage transient signals on the communication pair may not be reliable signals by which to determine telephone disconnect signaling. Instead, the disclosed preferred embodiment utilizes existing A-lead signaling to determine telephone station disconnect signaling during the fixed time interval when OSI occurs. However, other circuitry and signaling could be implemented to determine when the subscriber's telephone has been disconnected from the line circuit. For example, a line circuit which supplies a current to check the communication pair (channel) continuity between the line circuit and the subscriber's telephone could be used to signal a telephone station disconnect during the OSI interval.

Once in the BUSY3 state timer TA is set to time at the FCLK rate and timer TB at the WRA rate. When the A-lead is ungrounded ($\overline{XA}$) timer TA starts. Timer TA continues to count and at count 9, the HOLD state is entered, via path 402, when count 9 of timer TA is reached which is some 35 ms after $\overline{XA}$. The hold bridge relay H of FIG. 1 is also operated at this time. The time period of 35 ms allows for elimination of on-hook/off-hook switchhook skew switching transients. The A-lead open ($\overline{XA}$) condition indicates that the subscriber's telephone is not in a busy state, that is either the subscriber has hung up (i.e., goes on-hook) or has requested that the call be held. In either event a transition, 402, to the HOLD state results since $\overline{XA}$ T15A (FCLK) is logic 1.

Referring to FIG. 5, the circuit operation which generates the above flow chart description is described. The BUSY3 state flip-flop 502 is set and hence the output of gate 508 is logic 0. The logic 0 output of gate 508 overrides or forces in gate 509, the signal condition from BUSY1 flip-flop 513 which normally indicates the condition of the T and R leads. Correspondingly, the output of gate 509 is at logic 1. Since lead $\overline{XA}$ is logic 1, lead T15A is logic 1 and output of gate 509 is logic 1 the output of gate 510 is logic 0 setting HOLD state flip-flop 511. Thus, the HOLD state is established, during the fixed time interval (when flip-flop 502 is set), in response solely to the ungrounding of the A-lead. During this fixed time interval the HOLD state is established independent of the existence or non-existence of current flow (state of XD) on the T and R leads. Note, as described below, the fixed time interval expires when BUSY3 flip-flop 502 is cleared. Thereafter, the setting of HOLD state flip-flop 502 requires both the ungrounding of the A-lead and a signal (set output of BUSY1 flip-flop) indicating the existence of current on the T and R leads.

Referring to FIG. 4 again, in the event that the line circuit is in the BUSY3 state and the A-lead is never opened (subscriber remains off-hook) but remains at ground (XA=1) the line circuit remains in the BUSY3 state for a time value of T3B(WR) of approximately 0.75 seconds after which a transition, 403, is made to the BUSY1 state. While the disclosed embodiment utilizes flip-flop 502 for establishing the fixed time interval (0.75 seconds) it is obvious that a single shot or other circuitry could be utilized.

Referring to FIG. 5, the BUSY1 state flip-flop 513 is set by gate 516 when input lead T3B becomes logic 1 since the other inputs to gate 516, namely, the output of gate 504 and the set side of BUSY3 are logic 1. Thus, the BUSY1 state is established a fixed time interval T3B(WRA) after the BUSY3 state is established. The BUSY3 state flip-flop 502 is cleared by gate 512 when BUSY1 state flip-flop 513 is set. The BUSY3 state flip-flop 502 can also be cleared via gate 514 when the HOLD state flip-flop 511 is set. Finally, BUSY3 state flip-flop can be cleared when an IDLE state signal appears at the output of gate 515.

Thus, for a fixed time interval of 750 milliseconds (extending beyond anticipated OSI periods) after the termination of ringing the disclosed circuit enables a HOLD condition to be established or enabled, independent of the existence of a C.O. battery on the T and R leads, by the subscriber hanging-up or pressing the hold key. The side effect of preventing the subscriber from hanging-up in the conventional manner for the first 750 ms after answering a call is insignificant. When a subscriber desires to hang-up within 750 ms, he is automatically placed in the HOLD state thus requiring a pick-up and hang-up operation to cancel the HOLD state and to return to the IDLE state.

Referring to FIG. 4, after 750 ms elapses without a A-lead open ($\overline{XA}$=1) a state transition, 403, puts state machine 33A in the BUSY1 state. In the BUSY1 state the establishment, 404, of a HOLD state requires both the existence of current on the T and R lead (hence a C.O. battery connection to the telephone set) and the absence of a ground on the A-lead. This standard well known condition, a disconnect signal condition on the A-lead and a connect signal condition on the T and R leads, for establishing a HOLD state occurs only when the hold key is depressed. The standard hold enable operation which causes the transition, 404, from the BUSY1 state to the HOLD state is described in the following paragraphs. The description of the standard hold enable operation is the same as that described in the previously referenced Angner patent.

If a pulse should occur on lead XD while timer TA is between the counts of 0 and 6, inclusive, a transition, 405, from state BUSY1 to BUSY2 occurs. This is the disconnect path which occurs when the subscriber goes on-hook at the telephone creating a momentary voltage transition on leads T and R causing a XD=1 condition. Additionally, when the ground condition disappears from the A-lead ($\overline{XA}=1$) the line circuit returns, 406, to the IDLE state from the BUSY 2 state in response to the subscriber going on-hook.

Alternately, when in the BUSY1 state, if the subscriber presses the hold key the A-lead is ungrounded ($\overline{XA}=1$) and timer TA causes a transition, 404, to the HOLD state at count 9. Note, the transition, 404, from the BUSY1 state to the HOLD state only occurs if current is maintained (i.e., no voltage transient, XD=0) on the T and R lead. As noted in the prior paragraph a XD=1 condition causes, instead, a transition from the BUSY1 state to the BUSY2 state. Thus, once in the BUSY1 state the transition, 404, to the HOLD state requires the continuance of current flow on the T and R leads (no voltage transient, XD=0) when the A-lead opens.

To cancel the HOLD state the subscriber picks up (i.e., goes off-hook) the held line which causes a transition, 407, to the BUSY1 state. As shown in FIG. 4 the return from the HOLD state to the BUSY1 state requires the call to be picked up (XA=1) enabling timer TA to count at the rate of FCLK. After 15 counts of timer TA 59 ms has elapsed and transition 407 back to BUSY1 occurs. Upon entering the BUSY1 state, timer TA is reset, but XD remains high until the hold bridge relay H is dropped and line transients subside, satisfying the conditions for an immediate transition, 405, to BUSY2. Timer TA begins counting at the rate of FCLK as soon as XD goes low. The circuit returns to the BUSY1 state from the BUSY2 state and waits for the next event. Timer TB continues to count until it locks up. The first evidence of a disconnect appears when a pulse occurs on XD in response to the telephone station being disconnected from the communication pairs line. A transition, 405, from BUSY1 to BUSY2 occurs to record or remember the XD pulse. At the end of the pulse on XD, $\overline{XD}$ becomes logic 1. When the A-lead is open-circuited signal $\overline{XA}=1$. Thus, the condition, $\overline{XA}\ \overline{XD}$, for a BUSY2 to IDLE transition, 406, are satisfied which in effect is a station disconnect signal.

While the above implementation of our invention is described as part of a sophisticated logic controlled line circuit, its application with other line circuits is anticipated. For example, our disclosed invention can function with any line circuit having a hold relay which is locally or separately powered (i.e., not powered from the T and R leads). Thus, the line circuit hold relay can operate independent of current on the T and R leads and a call can be placed in the HOLD state during an OSI condition.

As noted previously, the normal enablement of a hold condition requires the concurrent detection of the disappearance of a ground on the A-lead and the continued existence of the subscriber's telephone network connection to the T and R leads (normally determined by current on T and R leads). Our invention teaches that during a fixed time interval following the answering of a ringing telephone a HOLD condition can be established using a signal condition that does not require the continued existence of the subscriber's telephone connection to the T and R lead. The disclosed hold arrangement requires only the existence of a disconnect signal and the preferred embodiment utilizes an ungrounded A-lead signal to enable the HOLD condition during the fixed time interval. The fixed time interval or period, however, is required to be longer than the OSI time period. Hence, for this period of time following the answering of a ringing telephone, a HOLD state is established by an ungrounding of the A-lead which occurs during either the pressing of the hold key or by a hang-up condition.

The disclosed time dependent hold enable circuit can also be implemented (not shown) using a timer circuit which forces, during the OSI period, the "network connection" condition to the hold enable circuit. Thus, during an OSI period the HOLD state would require only an ungrounding of the A-lead. Such a timer circuit requires an input from a ringing station answer detector circuit to enable the timer which then can either substitute for or force a "network connection" condition to the hold enable circuit. After the expiration of this time period, the timer allows the true "network connection" condition to be applied to the hold enable circuit. Thus, a HOLD state is enabled in the conventional manner when the timer expires.

The ringing station answer detector can be any of a variety of circuits which detect that the station has gone off-hook. The timer can be any analog or digital device, counter, shift register, delay line or other device which signals when a time period has elapsed. It is further anticipated that said timer can be implemented as multiple timers having multiple intervals which can be made to bridge other expected OSI periods or other hits or opens on the C.O. or PBX pair. Note, the timed interval can also be delayed from the termination of ringing if such is determined to be the characteristics of the OSI periods. Additionally, the telephone "network connection" detector need not be a shunt type detector as utilized in the disclosed embodiment. The prior art technique of utilizing a relay or current detector in series with the R lead can also be utilized as a telephone network connection detector. Finally, the disclosed invention can be implemented with existing hold enable circuits or incorporated into a new hold enable circuit design.

Thus it is to be understood that the embodiment described herein is merely illustrative of the principles of the invention. A variety of modifications thereto may be effected by persons skilled in the art without departing from the spirit and scope of our invention.

We claim:

1. A line circuit for use in a key telephone system for controlling a hold function on a communication path extending between a switching machine and a telephone station, said line circuit adapted for station connect and station disconnect signaling over said communication path and over an A-lead path between said line circuit and said station, said line circuit including means (509, 510, 511) jointly responsive to a station disconnect signal on said A-lead path and a station connect signal on said communication path for applying a hold impedance across said communication pair characterized in that means (502, 504, 508, 509, 510, 511) effective during a fixed time interval following a station connect answer occurring during a ringing signal from the switching machine for applying a hold impedance across the communication path solely in response to a station disconnect signal over one of said paths.

2. The invention of claim 1
characterized in that
said means for applying is responsive solely to a non-ground signal received over said A-lead path.

3. The invention of claim 2
characterized in that
said hold applying means includes
  means (504) for detecting a ringing station answer signal on said communication path, and
  means (502) operable in response to said ringing station answer detecting means for establishing the time interval.

4. The invention of claim 3
characterized in that
said time interval establishing means includes
  an interval terminating means (512, 513, 516) enabled by said ringing station answer detecting means for defining the termination of the time interval and
  a flip-flop means (502) set by said ringing station answer detecting means and reset by said interval terminating means.

5. A line circuit for use in a key telephone system for controlling the hold function on a communication pair extending between a switching machine and a telephone station, said line circuit including means (IC1A) for detecting signals on an A-lead between said line circuit and said station,
  means (IC1A, 103) responsive to signals on said communication pair for generating a control signal and
  means (510, 511) jointly responsive to said A-lead signal detecting means and said generating means control signal for applying a hold impedance across said communication pair characterized in that said line circuit further includes
  means (502, 504, 508, 509) interposed between said communication pair signal detection means and said hold applying means and effective during a fixed time interval following a station answer occurring during a ringing signal from the switching machine for applying a signal for the extent of said interval to said hold applying means equivalent to the control signal from said generating means whereby said hold applying means is rendered unresponsive to the generating means control signal during said fixed time interval.

6. The invention of claim 5
characterized in that
said generating means includes
  means (103) connected in shunt across said communication pair for detecting momentary station transition signals occurring whenever said telephone station makes an on-hook to off-hook or off-hook to on-hook transition.

7. The invention of claim 5
characterized in that
said line circuit further includes
  means (504) for detecting a ringing station answer signal on said communication pair and
  means (502) operable in response to said ringing station answer detecting means for establishing said fixed time interval.

8. The invention of claim 7
characterized in that
said time interval establishing means includes
  an interval terminating means (512, 513) enabled by said ringing station answer detecting means for defining the termination of the time interval and
  a flip-flop means (502) set by said ringing station answer detecting means and reset by said interval terminating means.

9. A line circuit for use in a key telephone system wherein said line circuit is adapted to control communication connections between a central switching machine and a telephone station, said line circuit comprising:

means (IC1A) for detecting the presence or the absence of a ground signal on an A-lead from said telephone station,
  means (IC1A, 103) for detecting a station answer occurring during a ringing signal on a communication pair between said switching machine and said station, characterized in that said line circuit further includes
  means (502, 504) for establishing a time interval in response to a signal from said ringing station answer detecting means and
  means (509, 510, 511) enabled during said established time interval means for applying a hold impedance across said communication pair in response to a signal from said A-lead detecting means indicating a transition from the presence to the absence of a ground signal on said A-lead.

10. The invention of claim 9
characterized in that
said established time interval means includes
  an interval terminating means (512, 513) enabled by said ringing station answer detecting means for defining the termination of the time interval and
  a flip-flop means (502) set by said ringing station answer detecting means and reset by said interval terminating means.

11. A method of enabling a hold condition on a telephone line extending between a switching machine and a line circuit of a telephone station comprising the steps of providing a signal indicating the answering of a ringing station telephone line,
  providing a signal indicating the transition from a grounded signal to an ungrounded signal on an A-lead extending between said line circuit and said telephone station and
  applying a hold impedance across said communication pair in response to said ringing station answering signal followed within a fixed time interval by said A-lead signal.

12. The invention of claim 11 wherein said applying step comprises the steps of
  storing said ringing station answering signal for a fixed timed interval and controlling the connection of said hold impedance in response to both said stored ringing station answering signal and said A-lead signal.

13. The invention of claim 12 wherein said applying step further comprises the steps of providing a signal a fixed time interval after said ringing station answering signal and clearing said stored ringing station answering signal in response to said fixed time interval signal.

* * * * *